United States Patent [19]

Kikuchi

[11] Patent Number: 5,068,679
[45] Date of Patent: Nov. 26, 1991

[54] IMAGING SYSTEM FOR MACROPHOTOGRAPHY

[75] Inventor: Juro Kikuchi, Kitatsuru, Japan

[73] Assignee: Olympus Optical Co., Ltd., Tokyo, Japan

[21] Appl. No.: 515,592

[22] Filed: Apr. 27, 1990

[30] Foreign Application Priority Data

Apr. 28, 1989 [JP] Japan .................... 1-111290
May 12, 1989 [JP] Japan .................... 1-119554

[51] Int. Cl.$^5$ .............................. G03B 9/02
[52] U.S. Cl. ..................... 354/271.1; 354/195.12; 359/740
[58] Field of Search .............. 354/271.1, 272, 273, 354/274, 195.1, 195.12; 350/449, 450, 355

[56] References Cited

U.S. PATENT DOCUMENTS 4,333,720  6/1982  Suzuki et al. ............... 354/227
4,927,241  5/1990  Kuijk .......................... 350/336
4,934,790  6/1990  Hohenecker ............... 354/271.1

FOREIGN PATENT DOCUMENTS 54-154741  10/1979  Japan .
59-201027  11/1984  Japan .
61-45812   10/1986  Japan .
62-91914    4/1987  Japan .
62-105125   5/1987  Japan .
63-208817   8/1988  Japan .

Primary Examiner—W. B. Perkey
Assistant Examiner—Cassandra C. Spyrou
Attorney, Agent, or Firm—Cushman, Darby & Cushman

[57] ABSTRACT

An imaging optical system having a photographic lens and a mechanical stop is provided with a variable focal length lens disposed adjacent to a mechanical stop and having a diameter smaller than a maximum diameter of a beam of light capable of traversing the mechanical stop when opened. Further, the imaging optical system may be provided with a physical stop capable of changing transmittance in an electric field or a magnetic field and constructed so that a maximum diameter of a light-blocking portion is smaller than that of the beam of light capable of traversing the mechanical stop when opened. Consequently, adjustment of the amount of light in ordinary photography and macrophotography is properly made and a camera with low cost is secured.

10 Claims, 3 Drawing Sheets

IMAGING SYSTEM FOR MACROPHOTOGRAPHY

BACKGROUND OF THE INVENTION a) Field of the invention:

The present invention relates to an imaging optical system of a camera with an illuminator, capable of photographing (macro-photographing) an object located at a distance closer than at a minimum focusing distance (namely, in a macrophotographic region).

b) Description of the prior art:

In recent years, an illuminator housing type camera having an automatic focusing function has been popularized, and consumers have demanded that such a camera should have relatively high accuracy, compact size and low cost. For this purpose, the adjustment of the amount of light in the case where an illuminator is employed is made by rendering the amount of radiation of the illuminator constant to control the aperture of a stop. Further, in most cases, the stop is also used as a shutter.

Where such a camera is used for macrophotography, it needs to make use of a stroboscope as the illuminator in order to assure portability and needs to prevent a blur in photographing. Further, it is necessary to render the aperture of the stop extremely small as compared with the case of ordinary photography for the adjustment of the amount of light. In addition, a lens shifting distance for focusing largely increases as compared with that in an ordinary photographic region, so that the camera has defects that the design of a lens shifting mechanism is considerably difficult and, as a result, oversizing and rises in manufacturing costs are caused.

Although measures may be taken to hold the lens shifting distance constant for focusing to some extent and the stop may be stopped down with respect to an object point to increase a depth of field, which thereby brings about a falsely in-focus condition, there is the defect that a good focus is not obtained in comparison with the case of the foregoing.

Accordingly, another type of camera is proposed in which a variable focal length lens making use of such an optical element that a refracting power is changed by pressure, voltages and currents is adopted as a photographic lens and in which the lens shifting distance for focusing is diminished so that the in-focus can be brought about. The lens such that the refracting power is changed by pressure is proposed by Japanese Patent Preliminary Publication Nos. Sho 62-124535 and Sho 63-208817 and one such that the refracting power is changed by voltages and the like is proposed by Japanese Patent Preliminary Publication Nos. Sho 62-153933, Sho 62-91914, Sho 61-140908 and Sho 61-160714.

The lenses composed of such optical elements, however, have disadvantages that in general, it is difficult to manufacture a lens with a large diameter and the scattering and absorption of light by the material constituting the variable focal length lens is increased compared with scattering by optical glass, and consequently a fear is aroused that the performance of the camera in ordinary photography will be lost.

Moreover, the use of the lens of the type which varies in configuration renders it difficult to perform accurate control of the pressure applied to the lens for deformation, and if the accurate control is intended to be realized, a driving device and control circuit will be large-sized, with the result that the raise of manufacturing costs is brought about. Further, of variable focal length lenses of the type in which the refracting power is changed by voltages and the like, one which is a liquid crystal lens and has a large diameter in particular causes the reduction of an operating speed and the deterioration of transmittance due to the increase of its thickness. As such, this lens is used as a Fresnel lens in most cases, but the Fresnel lens has the drawback that imaging performance in ordinary photography is reduced.

Furthermore, in the use of the liquid crystal lens, if it is intended that the optical system is constructed from a single liquid crystal lens, it will inevitably need polarizing plates, by which the amount of transmitting light is reduced to less than half, so that the loss of the amount of light in the ordinary photography is enormous. Although Japanese Patent Publication No. Sho 61-45812 offers the optical system in which two liquid crystal lenses whose orientation directions intersect at right angles are combined with each other so that no polarizing plate is used, this structure possesses the defect that astigmatism is generated in the ordinary photographic region.

On the other hand, the stop of the camera of the type, that is used in common with the shutter, renders accurate control of its aperture difficult and the aperture reduced to less than some extent constitutes a danger of causing unexposure.

Consequently, the following improved means are suggested.

A first means is such that the lens is shifted in a moderate position for fixation, the aperture of the stop is fixed to such size as to exhibit a proper exposure at a a certain distance, the depth of field is made large until the focus is taken, and the exposure depends on the latitude of a film, which is proposed by Japanese Patent Preliminary Publication Nos. Sho 58-152227, Sho 59-149334, Sho 56-151919, and Sho 59-201027 and Japanese Utility Model Preliminary Publication No. Sho 61-88122.

A second means is such that in addition to the stop for ordinary photography, another stop for close-up photography smaller in aperture is together provided and a small aperture stop stable in the close-up photography is available, which is also proposed by Sho 59-201027 mentioned above.

Finally, as a third means, a stop utilizing the physics of an aperture stop as a liquid crystal stop (which will be hereinafter referred to as a physical stop) is widely known which is constructed from a member capable of changing the transmittance electrically or magnetically to control accurately the aperture of the stop, and, for example, stops making use of polarization (Japanese Utility Model Preliminary Publication No. Sho 54-154741) and making no use of the polarization (Japanese Patent Preliminary Publication No. Sho 62-105125) are available.

In the first means, however, a mechanical stop also serving as the shutter is used in most cases and its accuracy is low due to high-speed operation. Moreover, it is inevitable that in order to prevent the unexposure, the aperture of the stop is made large and the photography in a macrophotographic region is set to over-exposure so that a print by almost proper exposure is secured depending on the latitude of the film as stated above or the macrophotographic region is set at some distance. Either case is unfavorable for photographic accuracy per se of the camera.

Further, the second means has disadvantages that since two stops are disposed together, the mechanism is bulky and the camera is large-sized.

The third means has a serious defect that since the scattering and absorption of light of material constituting the physical stop increases as compared with scattering by optical glass, the performance of the image in ordinary photography will deteriorate. Further, most of the physical stops, having poor light-blocking properties, are such that when an aperture portion is completely larger than a light-blocking portion, the effect of the stop is brought about, whereas when the stop is stopped down and the area of the light-blocking portion becomes larger, the amount of light transmitted by the light-blocking portion increases, so that a stopping-down effect of making the depth of field large will not be secured and if the amount of the transmitted light becomes greater than that of light traversing the aperture portion, F-number will become close to an open value of the aperture.

By the way, since such an illuminator that the amount of radiation can be adjusted in response to a photographing distance is difficult to be manufactured as a small-sized one and comes expensive, it cannot be adopted.

SUMMARY OF THE INVENTION

A primary object of the present invention is to provide an imaging optical system of a camera that has high accuracy, compact size and low cost, and is capable of macrophotographing an object located in a macrophotographic region.

Another object of the present invention is to provide an imaging optical system in which an imaging lens and a variable focal length lens are used to be able to accurately bring about an in-focus condition in ordinary photography and macrophotography and a mechanism can be small-sized.

Still another object of the present invention is to provide an imaging optical system such that a physical stop is employed, in addition to a mechanical stop, to be capable of making proper adjustment to the amount of light in the ordinary photography and macrophotography and to have the mechanism be small-sized.

According to the present invention, the imaging optical system is provided with a variable focal length lens having a diameter smaller than the maximum diameter of a beam of light capable of traversing the mechanical stop when opened, apart from the imaging lens, on an optical axis adjacent to the mechanical stop. Thus, focal adjustment is made by the imaging lens in the ordinary photography and principally by the variable focal length lens in macrophotography.

Further, according to the present invention, the imaging optical system includes the physical stop capable of changing transmittance in virtue of an electric field or magnetic field on the optical axis adjacent to the mechanical stop and constructed so that the maximum diameter of its light-blocking portion is smaller than that of the beam of light capable of traversing the mechanical stop when opened. Thus, exposure control is performed by the mechanical stop in ordinary photography and principally by the physical stop in macrophotography and a depth of field can be increased.

These and other objects as well as the features and the advantages of the present invention will become apparent from the following detailed description with the preferred embodiment when taken in conjunction with the accompanying drawings.

DESCRIPTION OF THE PREFERRED EMBODIMENT

Referring to FIGS. 1 to 4, the embodiment of the present invention will be described below.

Figure 1:
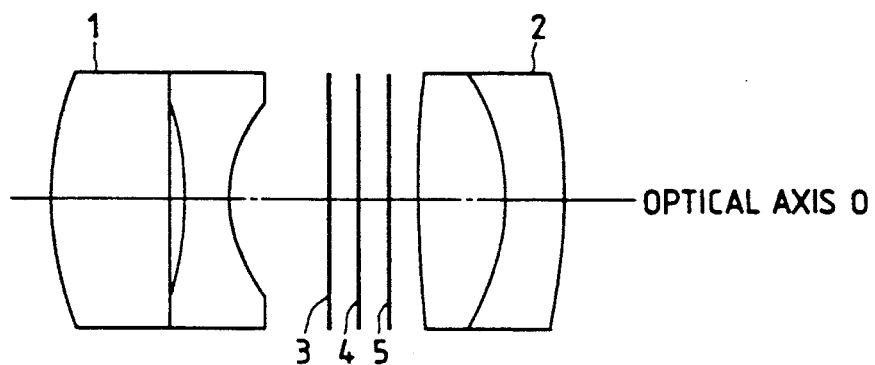
FIG. 1 is a view showing a fundamental arrangement of an imaging optical system according to the present invention.
Figure 2:
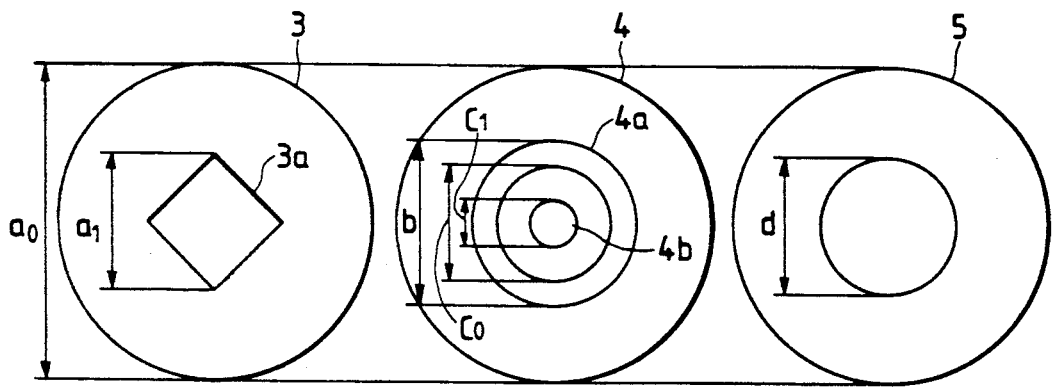
FIG. 2 is a schematic plan view showing a mechanical stop, physical stop and variable focal length lens.

FIG. 1, of these figures, shows a fundamental arrangement of the imaging optical system, in which reference numerals 1 and 2 represent lens systems disposed on an optical axis 0 and 3 a mechanical stop arranged between the lens systems 1 and 2. In the mechanical stop 3, the maximum and minimum diameters of an aperture portion 3a are taken as $a_0$ and $a_1$ respectively (refer to FIG. 2). Reference numeral 4 represents a physical stop which is, for example, a liquid crystal stop, disposed in the vicinity of the mechanical stop 3, in which the maximum diameter of a light-blocking portion 4a is taken as $b$ and the maximum and minimum diameters of an aperture portion 4b as $c_0$ and $c_1$ respectively (refer to FIG. 2). Further, these diameters are defined as $$b \geq a_1 \geq c_0$$

Reference 5 designates a variable focal length lens which is, for example, a liquid crystal lens, arranged behind the physical stop 4 and adjacent to the mechanical stop 3 and its aperture is taken as d and defined as $$d > c_0$$

Although FIG. 1 shows the physical stop 4 and the variable focal length lens 5 which appear to be separated diagrammatically, they may be arranged integral with each other. The structure of such both components is further explained in reference to the sectional view of FIG. 4 as follows: For the physical stop 4, reference numerals 6 and 7 represent polarizing plates, 8 and 8' a pair of transparent conducting layers connected to a power source $S_1$, 9 a twisted nematic (TN) liquid crystal enclosed by a light-blocking portion 10 between the transparent conducting layers 8 and 8', and 11 a transparent substrate around the periphery of the light-blocking portion 10. In the variable focal length lens 5, on the other hand, reference numerals 12 and 13 designate transparent substrates, 14 and 14' a pair of transparent conducting layers connected to a power source $S_2$, and 15 a nematic liquid crystal enclosed by a spacer 16 between the transparent conducting layers 14 and 14'.

Also, the physical stop 4 and the variable focal length lens 5 may be disposed either before or behind the mechanical stop 3.

Where a driving mechanism for the physical stop 4 or the variable focal length lens 5 is composed of an opaque member and needs to be arranged adjacent to the stop 4 or the lens 5, it is provided in the space between the light-blocking portion b and the aperture portion $c_0$ of the physical stop 4 and influence on photographic performance can then be minimized.

Further, in macrophotography, it is convenient for photography of an object located in a macrophotographic region that the entire lens system is set at the nearest in-focus position in ordinary photography, rather than at an infinite in-focus position therein. Accordingly, the entire lens system is preferably designed so that it is moved to the nearest photographic position by the input of a macrophotographic signal, for instance. The macrophotographic signal may be directly outputted by a distance-measuring device of a camera in regard to an object being photographed, located in the macrophotographic region, or by turning on a switch based on the photographer's own judgment. In addition, a method is followed that, by the macrophotographic signal or when the diameter of the aperture portion 3a of the mechanical stop 3 is stopped down to a predetermined aperture, the physical stop 4 and the variable focal length lens 5 come to be driven. Also, the entire lens system may well be constructed so that it is moved to the nearest photographic position, thereby enabling the macrophotographic signal to be outputted.

This embodiment is constructed as mentioned above and subsequently its function will be explained.

First, in the ordinary photography, in-focus is attained by mechanically shifting the lens systems 1 and 2 the variable focal length lens 5 is not driven. The adjustment of the amount of light is principally made by the mechanical stop 3, and the physical stop 4 is set so that the light-blocking portion 4a and the aperture portion 4b are in a transmitting or light-blocking condition. It is rather advantageous to the amount of light that the physical stop 4 remains in the transmitting condition, but even though in the light-blocking condition, no problem arises in practical use if the diameter b of the light-blocking portion 4a in the light-blocking condition is much smaller than the aperture portion 3a of the mechanical stop 3. Where the physical stop 4 is made to be in the light-blocking condition, the photography will not be affected by the arrangement of the diameters of b>d, even though the refracting power of the variable focal length lens 5 has any value. Contrary, where the physical stop 4 is made to be in the light-blocking condition, it is required that the refracting power of the variable focal length lens 5 is made equivalent to that of the transparent members constituting the lens 5 so that imaging performance is not affected by the refracting power of the lens 5.

Next, in macrophotography, the entire lens system is shifted to the photographic position located at the most minimum focusing distance by the input of the macrophotographic signal, for instance, and the in-focus is attained by driving principally the variable focal length lens 5. Further, since light is forcedly emitted from a stroboscope, the aperture portion 3a of the mechanical stop 3 is fixed to the predetermined minimum diameter $a_1$. The adjustment of the amount of light is mainly made by the drive of the physical stop 4, in which a portion lying on the side of the optical axis with respect to the diameter b of the light-blocking portion 4a blocks the light and another portion lying on the side of the optical axis in regard to a desired diameter c' ($c_0 \geq c' \geq c_1$) of the aperture portion 4b determined in response to the object being photographed transmits the light.

Figure 5:
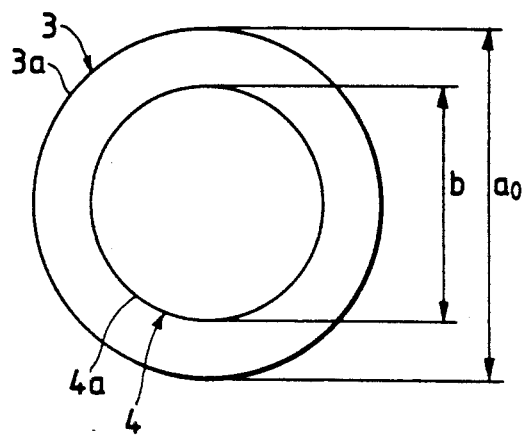
FIG. 5 is a view showing a relationship between the aperture portion of the mechanical stop and the light-blocking portion of the physical stop.
Figure 6:
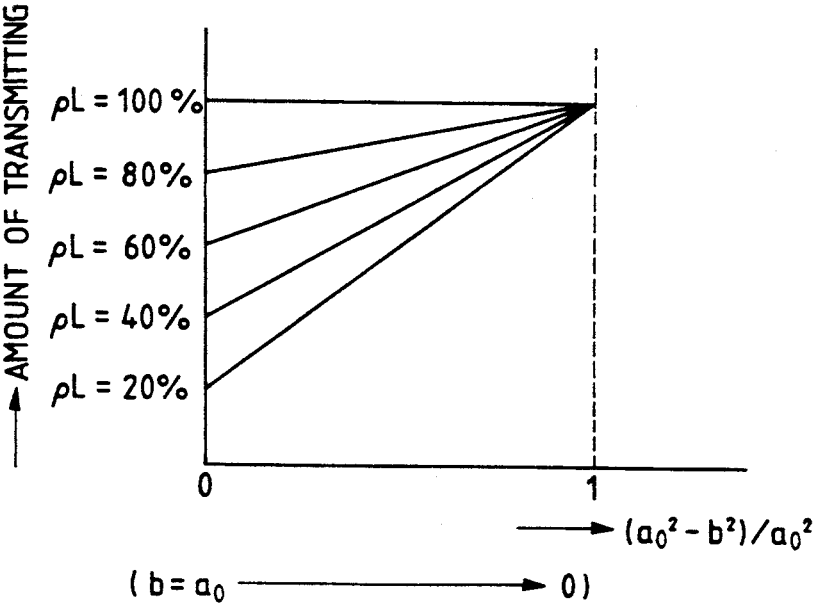
FIG. 6 is a diagram showing a relationship between the diameter of the light-blocking portion of the physical stop in FIG. 5 and the amount of transmitting light.

Referring now to FIGS. 5 and 6, the adjustment of the amount of light is further explained. When the shape (the diameter $a_0$) of the aperture portion 3a in opening the mechanical stop 3 is assumed to be circular for convenience of explanation, similar to the outermost shape (the diameter b) of the light-blocking portion 4a of the physical stop 4, and their areas are represented by $Aa_0$ and $Ab$ respectively, the areas are given by $$Aa_0 = \pi a_0^2/4, \quad Ab = \pi b^2/4$$

Further, the transmittance of the section between the diameter $a_0$ of the aperture portion 3a and the diameter b of the light-blocking portion 4a is taken as 1 and that of the inside of the light-blocking portion 4a as $\rho_L$. In addition, when the transmittance of the inside of the maximum aperture (the diameter $c_0$) of the aperture portion 4b is assumed to be the same as that of its periphery (namely, $\rho_L$) for simplification, and the comparison between respective amounts of light Lx, Ly of a conventional example in which ordinary photography and macrophotography are performed by the physical lens only and the present invention is made under a stop opening condition in ordinary photography (in this case, the light-blocking portion 4a is assumed to be in the transmitting condition), the amounts of light are expressed by $$\begin{aligned} L_x &= Aa_0 \rho_L = \pi a_0^2/4 \cdot \rho_L, \\ L_y &= (Aa_0 - Ab) \cdot 1 + Ab \cdot \rho_L \\ &= \pi(a_0^2 - b^2)/4 + \pi b^2/4 \cdot \rho_L \end{aligned}$$

and their subtraction becomes $$\begin{aligned} L_y - L_x &= (1 - \rho_L)(Aa_0 - Ab) \\ &= \pi(1 - \rho_L)(a_0^2 - b^2)/4 \end{aligned}$$

From the preceding formulas, it is understood that if the diameter b is smaller than the diameter $a_0$, the amount of light under the opening condition in the ordinary photography can be increased. Although it is also evident that if the diameter b becomes even smaller, the amount of light can be further increased, the size of the diameter b is limited by the condition ($b \geq a_1 \geq c_0$) for bringing about the stopping-down effect in the macrophotography.

In any case, the area Ab of the diameter b of the physical stop 4 is determined by various factors and it is understood that if the area Ab of the light-blocking portion 4a of the physical stop 4 is smaller than the aperture area $Aa_0$ in the opening of the mechanical stop 3, the amount of light under the opening condition in ordinary photography can be increased.

Further, the relationship between the diameter $a_0$ and the amount of transmitting light, as the transmittance $\rho_L$, in the case where the size of the diameter b varies from $a_0$ to 0 is as shown in FIG. 6 and it follows from this diagram that the amount of transmitting light increases as the diameter b becomes small.

Also, in the figure, $(a_0^2 - b^2)/a_0^2$ is the formula for representing the variation of the diameter b on the axis of abscissa with simplified values (0→1).

Figure 7:
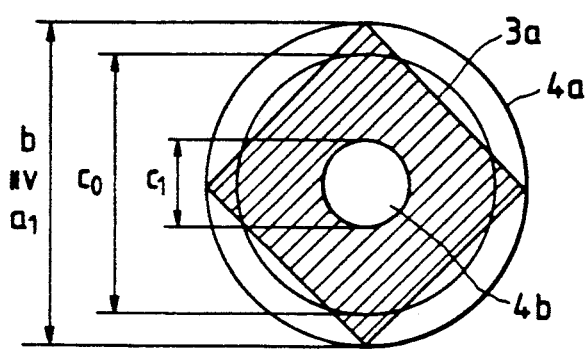
FIGS. 7 and 8 are views for explaining light-transmitting portions of the aperture portion of the mechanical stop and the light-blocking portion of the physical stop.

Referring now to FIG. 7, the stopping-down effect for securing a large depth of field in macrophotography is explained.

Where it is necessary that the aperture portion 4b of the physical stop 4 is stopped down to the minimum diameter $c_1$, if the relationship between the amount of light traversing the aperture portion 4b which is represented by F in, and the amount of light passing through the light-blocking portion 4a between the diameters b and $c_1$ (and the aperture portion 3a of the mechanical stop 3) (namely, a hatching portion in FIG. 7) which is represented by F out, is given by $$\frac{F \text{ out}}{F \text{ in}} = 1$$

the stopping-down effect will not be brought about. Accordingly, it is necessary for the effect that $$F \text{ out} < F \text{ in} \quad\quad\quad (1)$$

and it is particularly desirable that $$F \text{ out} \leq F \text{ in}/2 \quad\quad\quad (2)$$

Whereby, the depth of field becomes large and a sharp image is attained. Also, the values of the diameters $a_1$ and $C_0$ are limited by Formula (1).

Furthermore, the foregoing will specifically be explained as follows:

When the area of the square aperture portion 3a of the mechanical stop 3 is given by $$Aa_1 = a_1^2/2 \quad\quad\quad (3)$$

the area of the circular aperture portion 4b of the physical stop 4 is given by $$Ac_1 = \pi c_1^2/4 \quad\quad\quad (4)$$

and the relationship between the transmittances is written as $$\frac{\text{Transmittance of the light-blocking portion } 4a \text{ of the physical stop 4}}{\text{Transmittance of the aperture portion } 4b \text{ of the physical stop 4}} = \rho$$

Formula (1) becomes $$(Aa_1 - Ac_1)\rho \leq Ac_1 \quad\quad\quad (1)'$$

and substitution of Formulas (3) and (4) in this formula gives $$\frac{a_1}{\sqrt{2}} \leq \sqrt{\frac{1+\rho}{\rho}} \cdot \frac{\sqrt{\pi}}{2} \cdot c_1 \quad\quad\quad (5)$$

Further, Formula (2) is rewritten as $$(Aa_1 - Ac_1)\rho \leq Ac_1/2 \quad\quad\quad (2)'$$

and substitution of Formulas (3), (4) and (5) in the formula gives $$a_1 < \sqrt{\frac{1+2\rho}{\rho}} \cdot \frac{\sqrt{\pi}}{2} \cdot c_1 \quad\quad\quad (6)$$

so that the relationship between the diameters $a_1$ and $c_1$ for securing a better stopping-down effect is defined.

Figure 8:
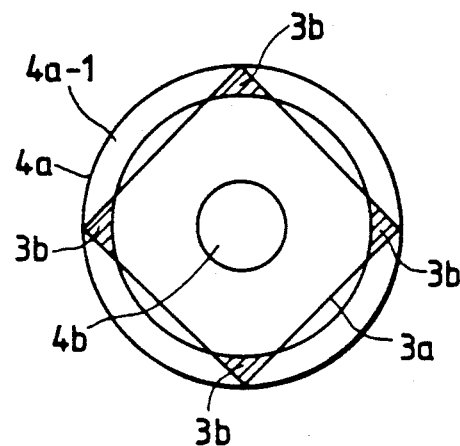

Also, when a member reducing the transmittance of light, like the polarizing plate, is not arranged inside the diameter $c_1$ of the aperture portion 4b of the physical stop 4, the amount of transmitting light of the $Aa_1$ can be made larger.

Where a light-blocking portion $4a-1$ (refer to FIG. 8) between the diameters b and $c_0$ of the physical stop 4 is composed of a member having a considerable light-blocking effect such as iron, the value obtained by subtracting an area $A_3b$ of common portions 3b of the light-blocking portion $4a-1$ and the aperture portion 3a of the mechanical stop 3 from the area $Aa_1$ will be applied to the area $Aa_1$ of each of Formulas (1)' and (2)'.

Further, where the light-blocking portion $4a-1$ consists of a member permeable to the light in some extent, the relationship between the transmittances is taken as $$\frac{\text{Transmittance of the light-blocking portion } 4a-1 \text{ of the physical stop 4}}{\text{Transmittance of the aperture portion } 4b \text{ of the physical stop 4}} = \rho'$$

and if $$A_3b \cdot \rho' < \frac{Ac_1}{10}$$

the stopping-down effect corresponding to Formula (2) or (2)' will be brought about.

As discussed above, according to the embodiment, the adjustment of the amount of light and the in-focus are executed by the lens systems 1 and 2 and the mechanical stop 3 in the ordinary photography and principally by the physical stop 4 and the variable focal length lens 5 in the macrophotography. In the case of the macrophotography in particular, the aperture of the mechanical stop 3 bears the minimum diameter $a_1$, so that it is required that the maximum diameter b of the light-blocking portion 4a of the physical stop 4 is larger than the diameter $a_1$ and the minimum diameter $c_1$ of the aperture portion 4b is smaller than the diameter $a_1$. It is, however, necessary only that the diameter b of the light-blocking portion 4a of the physical stop 4 is at least smaller than the maximum diameter $a_0$ of the mechanical stop 3, thereby enabling the physical stop 4 to be small-sized.

Moreover, in the macrophotography, the physical stop 4 brings about a stable small aperture stop smaller than the stop of the diameter $a_1$, a proper exposure without any fear of causing the unexposure, and a larger depth of field.

Also, if the light-blocking capacity of the light-blocking portion 4a of the physical stop 4 is low, the larger depth of field is not attained, while only the adjustment of the amount of light is greatly possible and the proper exposure is acquired.

Where the stop diameter has considerably diminished, even in ordinary photography, the use of the physical stop 4 and the variable focal length lens 5 makes it possible to effect the adjustment of the amount of light and the in-focus.

For the camera under consideration of the present invention, a shutter is often used also as the stop and, in such an instance, it is only necessary to regard the maximum diameter $a_0$ of the aperture portion $3a$ of the mechanical stop 3 as the maximum aperture diameter of the shutter and the minimum diameter $a_1$ as the minimum aperture diameter of the shutter at the exposure.

Although, in the above description, two types of the lens systems 1, 2 and the variable focal length lens 5 disposed as the lenses, only the common lens systems 1, 2 may be arranged.

The embodiment defined by numerical data will be explained in detail below.

EMBODIMENT

Figure 3:
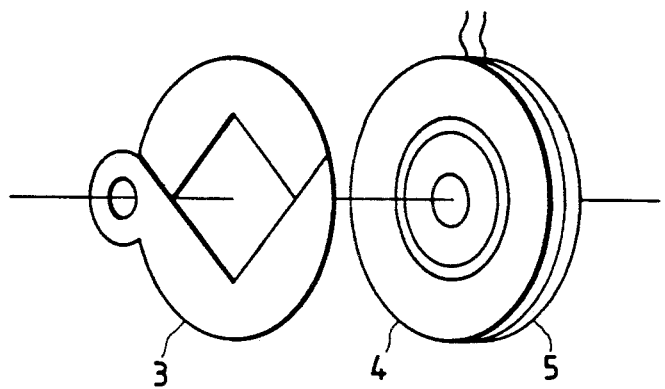
FIG. 3 is a schematic perspective view showing the mechanical stop, physical stop and variable focal length lens.
Figure 9:
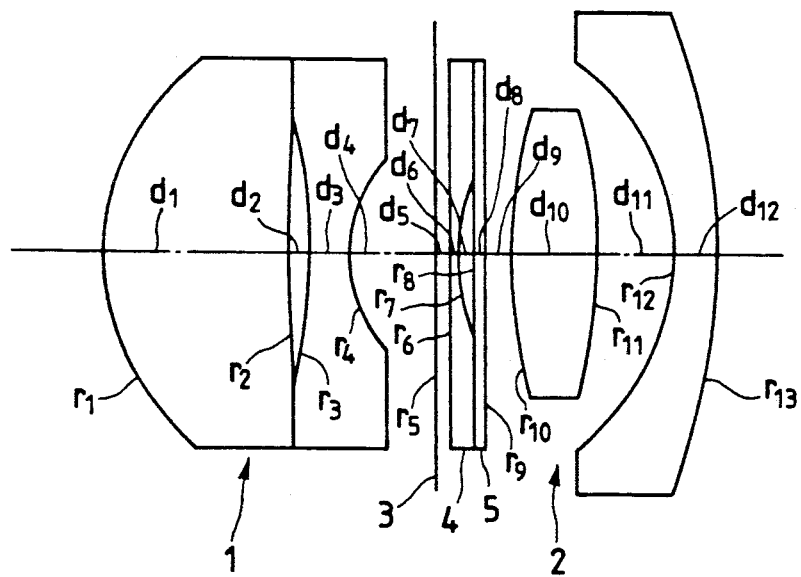
FIG. 9 is a view showing an arrangement of an embodiment defined by numerical values.

The arrangement of this embodiment is shown in a sectional view of FIG. 9, in which the stops 3, 4 and the variable focal length lens 5 are constructed similar to the example of FIG. 3.

In FIG. 9, the mechanical stop 3 is used in common with the shutter and the minimum aperture diameter $a_1$ of the aperture portion $3a$ is controlled to correspond to any of F-numbers of 10 to 16. The liquid crystal stop utilizing polarization (polarizing plate—TN liquid crystal—polarizing plate) is used as the physical stop 4 and its outer diameter is set to such size that it is larger than the diameter corresponding to an F-number of 10 and a beam of light lying inside the diameter corresponding to F No. 9 traverses surely the liquid crystal stop 4. Further, the liquid crystal stop 4 is adapted to control a stop value within a range of F-numbers of 16 to 64.

Figure 4:
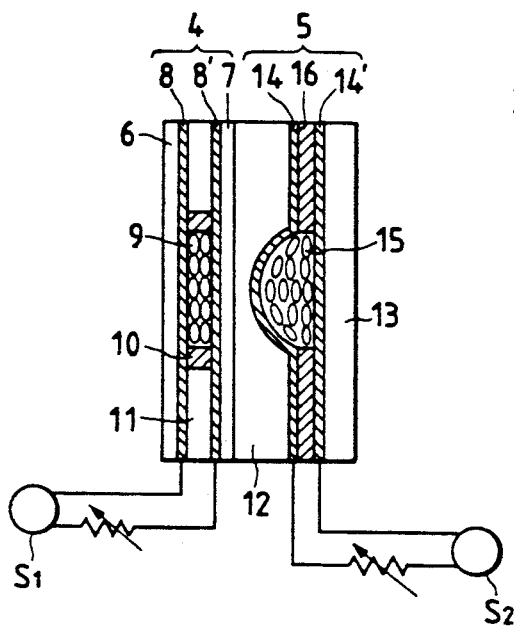
FIG. 4 is a schematic sectional view showing the physical stop and variable focal length lens.

As the variable focal length lens 5, the liquid crystal lens (which is such that the polarizing plates are used in common with the liquid crystal stop 4 and the liquid crystal lens layer is single—refer to FIG. 4) is employed and its outer diameter is set to such size (a radius of 1.145) that it is larger than the diameter corresponding to an F-number of 16 and the beam of light of the diameter corresponding to an F-number of 15 can traverse without being eclipsed.

The refractive index of the case enclosing the liquid crystal is set at 1.5 which coincides with the value of a refractive index $n_0$ of the liquid crystal.

With respect to the following data, $r_1, r_2, ....$ represent radii of curvature of surfaces of individual lenses and stops, $d_1, d_2, ....$ thicknesses of individual lenses and stops and airspaces among them, $n_1, n_2, ....$ refractive indices of individual lenses and stops, and $\nu_1, \nu_2, ....$ Abbe's numbers of individual lenses and stops.

First surface
$r_1 = 10.928$, $d_1 = 2.657$, $n_1 = 1.6968$,
$\nu_1 = 55.5$
Second surface
$r_2 = 32.438$, $d_2 = 1.043$
Third surface
$r_3 = -52.226$, $d_3 = 1.022$, $n_3 = 1.7552$,
$\nu_3 = 27.5$
Fourth surface
$r_4 = 24.328$, $d_4 = 1.533$
Fifth surface
$r_5 = \infty$ (stop), $d_5 = 0.269$ Sixth surface
$r_6 = \infty$, $d_6 = 0.480$, $n_6 = 1.5000$,
$\nu_6 = 57.5$ Liquid crystal stop
Seventh surface
$r_7 = 32.786$, $d_7 = 0.020$, $n_7 = 1.5 \sim 1.7$,
$\nu_7 = 30 \sim 25$ Liquid crystal lens
Eighth surface
$r_8 = \infty$, $d_8 = 0.500$, $n_8 = 1.5000$,
$\nu_8 = 57.5$
Ninth surface
$r_9 = \infty$, $d_9 = 0.100$,
Tenth surface
$r_{10} = 21.906$, $d_{10} = 4,831$, $n_{10} = 1.6237$,
$\nu_{10} = 47.1$
Eleventh surface
$r_{11} = -29.369$, $d_{11} = 6.175$
Twelfth surface
$r_{12} = -7.218$, $d_{12} = 2.044$, $n_{12} = 1.4922$,
$\nu_{12} = 57.5$
Thirteenth surface
Aspherical surface,
Overall lens length 20.674
Aspherical surface $R = -14.761$, $A_4 = 0.26946 \times 10^{-4}$,
$A_6 = -0.92516 \times 10^{-6}$, $A_8 = 0.10629 \times 10^{-7}$,
$A_{10} = 0.64435 \times 10^{-10}$ Next, the operation of the camera in the embodiment will be explained with regard to only the infocus and the exposure.

In the ordinary photography, the liquid crystal stop 4 is made to be in a transmitting state and the refractive index of the liquid crystal lens 5 is set at 1.5 equal to that of the liquid crystal case, so that the members 4 and 5 are in the same situation as a case where a plane-parallel plate is disposed, in view of paraxial rays and aberrations, though the amount of light is somewhat diminished by the polarizing plates.

In macrophotography, on the other hand, the entire lens system is shifted to the nearest photographic position (an object-to-image distance of 1000 mm), independently of the position of the object being photographed, by the input of the macrophotographic signal, and where the object being photographed is located closer than the nearest photographic position, the infocus is performed by the liquid crystal lens 5. Further, the shutter is set to open, irrespective of exposure, until a predetermined minimum aperture diameter $a_1$ is reached, and the exposure is adjusted by the liquid crystal stop 4.

The following table gives the refractive indices of the liquid crystal lens 5, principal paraxial values of the photographic lens, the stop diameters at the object-to-image distance, etc. The transmittance of the liquid crystal stop 4 is here 30%.

TABLE

| Refractive index of liquid crystal lens | Focal length | Front/back focal length | Object-to-image distance | Optimum stop radius (Guide No. 10) | |
|---|---|---|---|---|---|
| 1.5000 | 35.000 | −42.396/ 15.201 | 1000.0 | 1.554 | (Mechanical stop) |
| 1.6000 | 31.765 | −37.831 12.910 | 353.6 | 0.931 | (Liquid crystal stop) |
| 1.7000 | 29.078 | −34.038/ 11.006 | 224.2 | 0.589 | (Liquid crystal stop) |

As the effects of the embodiment, it is enumerated that the combination of the liquid crystal stop 4 with the liquid crystal lens 5 makes the arrangement useful due to the common use of the polarizing plates and individual electrodes, which are transparent, little affect the beam of light in the ordinary photography.

Further, if, in the ordinary photography photography, the F-number is set at 2.8 under the opening condition of the mechanical stop 3, the transmittance of the liquid crystal lens portion is 30% and therefore the loss of the amount of light becomes $$(2.8/9)^2 \cdot 0.7 = 0.06775$$

namely, nearly 7%, which is extremely low as compared with that of 70% caused in the case where the polarizing plates are employed over the entire effective diameter like the prior art.

If the liquid crystal lens 5 is of such a type standing in no need of the polarizing plates as to be composed of plural liquid crystal lenses in which orientation directions of liquid crystals intersect at right angles with each other, the increase of the amount of transmitting light will be expected by replacing the liquid crystal stop 4 with that of a type also making no use of the polarizing plates. In such an instance, although astigmatism is generated, the liquid crystal lens 5 is used only in the stopping-down condition, thereby increasing substantially the depth of field and enabling the effect of the astigmatism to be reduced.

As stated above, according to the imaging optical system of the present invention, the physical stop is arranged, in addition to the mechanical stop, in which the maximum diameter of the light-blocking portion is smaller than that of the light beam capable of traversing the mechanical stop when opened, so that the adjustment of the amount of light in the macrophotography and the ordinary photography can properly be made and the danger of unexposure which may be caused in the macrophotography is avoided, with the result that a stable small aperture stop is obtained. Further, a larger depth of field can be secured. Moreover, because the physical stop is small-sized, its manufacture can be facilitated with resultant low manufacturing cost and the camera can be made compact in size.

What is claimed is:

1. An imaging optical system comprising:
a photographic lens,
a mechanical stop having a variable size aperture, and
a variable focal length lens disposed adjacent to said mechanical stop and having a diameter smaller than a minimum diameter aperture of said mechanical stop,
wherein said imaging optical system allows only a portion of a beam of light traversing the aperture of said mechanical stop to pass through the variable focal length lens when the aperture of said mechanical stop is maximized, and
wherein said imaging optical system allows an entire beam of light traversing the aperture of said mechanical stop to pass through said variable focal length lens when the aperture of said mechanical stop is minimized.

2. An imaging optical system according to claim 1, wherein said mechanical stop is stopped down so that the entire beam of light traversing the aperture of said mechanical stop passes through said variable focal length lens in macrophotography.

3. An imaging optical system according to claim 1 or 2, wherein said variable focal length lens comprises a pair of transparent substrates, a pair of transparent conducting layers connected to a power source and contained between said pair of transparent substrates, and a liquid crystal enclosed between said pair of transparent conducting layers.

4. An imaging optical system according to claim 1 or 2, further comprising a physical stop disposed adjacent to said mechanical stop and having an area with a transmittance is changed by application of an electric field or a magnetic field thereto,
wherein said variable focal length lens is integral with said physical stop,
wherein a diameter of the beam of light traversing the aperture of said mechanical stop is larger than that of said area whose transmittance is changed when the aperture of said mechanical stop is opened a maximum amount, and
wherein said mechanical stop is stopped down so that the entire beam of light traversing the aperture of said mechanical stop passes through said area of said physical stop whose transmittance is changed in macrophotography.

5. An imaging optical system according to claim 3, further comprising a physical stop disposed adjacent to said mechanical stop and having an area whose transmittance is changed by application of an electric field or a magnetic field thereto,
wherein said variable focal length lens is constructed integrally with said physical stop,
wherein a diameter of the beam of light traversing the aperture of said mechanical stop is larger than that of said area whose transmittance is changed when the aperture of said mechanical stop is opened to a maximum, and
wherein said mechanical stop is stopped down so that the entire beam of light traversing the aperture of said mechanical stop passes through said area of said physical stop whose transmittance is changed in macrophotography.

6. An imaging optical system having a photographic lens and a mechanical stop, said imaging optical system comprising:
a physical stop disposed adjacent to said mechanical stop,
wherein said physical stop has an area with a transmittance that is changed by application of an electric field or a magnetic field, and
wherein said physical stop is constructed so that a diameter of a beam of light traversing an aperture of said mechanical stop is larger than that of said area of said physical stop whose transmittance is changed when the aperture of said mechanical stop is opened a maximum amount.

7. An imaging optical system according to claim 6, wherein said mechanical stop is stopped down so that the entire beam of light traversing the aperture of said mechanical stop passes through area of said physical stop whose transmittance changes in macrophotography.

8. An imaging optical system according to claims 6 or 7, wherein said physical stop comprises a pair of polarizing plates, a pair of transparent conducting layers connected to a power source and contained between said pair of polarizing plates, and a liquid crystal enclosed between said pair of transparent conducting layers.

9. An imaging optical system according to claim 6 or 7, further comprising a variable focal length lens disposed adjacent to said mechanical stop, wherein said physical stop is integral with said variable focal length lens, wherein the diameter of the beam of light traversing the aperture of said mechanical stop is larger than that of said variable focal length lens when the aperture of said mechanical stop is opened a maximum amount, and wherein said mechanical stop is stopped down so that the entire beam of light traversing the aperture of said mechanical stop passes through said variable focal length lens in macrophotography.

10. An imaging optical system according to claim 8, further comprising a variable focal length lens disposed adjacent to said mechanical stop, wherein said physical stop is integral with said variable focal length lens, wherein the diameter of the beam of light traversing the aperture of said mechanical stop is larger than that of said variable focal length lens when the aperture of said mechanical stop is opened to a maximum, and wherein said mechanical stop is stopped down so that the whole of the beam of light traversing the aperture of said mechanical stop passes through said variable focal length lens in macrophotography.

* * * * *